Sept. 6, 1938.  W. N. SCHULER  2,129,447
SHIPPING CONTAINER FOR FILM MAGAZINES
Filed Aug. 13, 1936
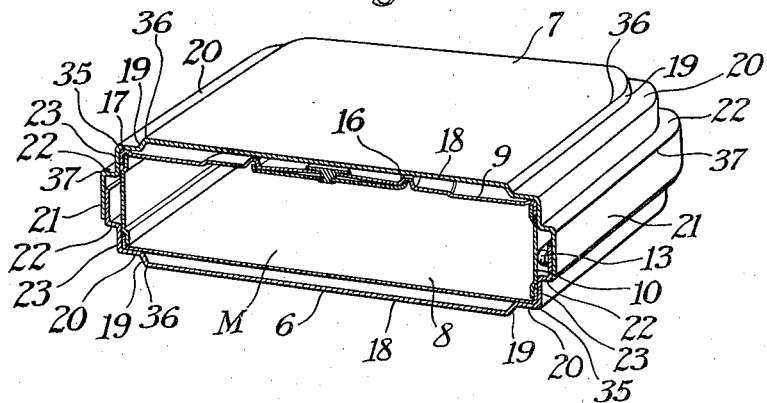
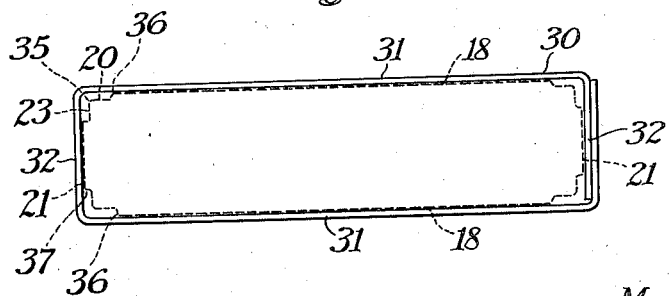
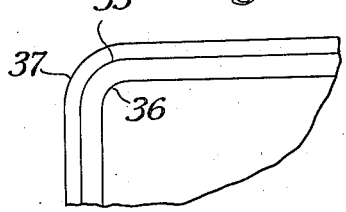
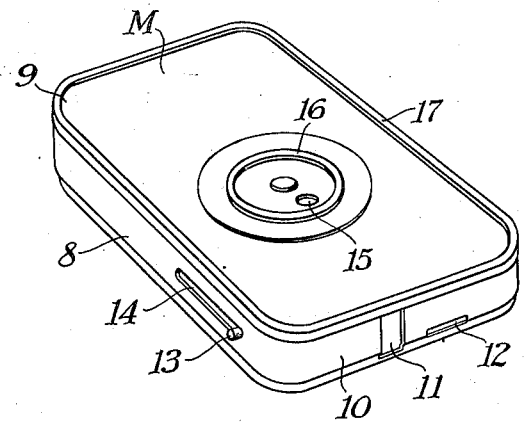
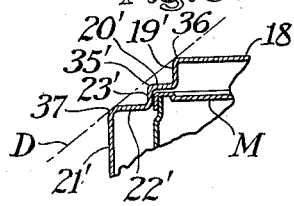
William N. Schuler
INVENTOR.
BY
ATTORNEYS Patented Sept. 6, 1938

2,129,447

UNITED STATES PATENT OFFICE 2,129,447

SHIPPING CONTAINER FOR FILM MAGAZINES

William N. Schuler, Rochester, N. Y., assignor, by mesne assignments, to Eastman Kodak Company, Jersey City, N. J., a corporation of New Jersey Application August 13, 1936, Serial No. 95,788

7 Claims. (Cl. 206—1)

This invention relates to a shipping container which is adapted to receive and hold a film magazine in such a way that the walls of the magazine are protected from pressure applied to the walls of said container.

For use in the newer cameras of the magazine type, which are particularly adapted for rapid and simple loading, the film is supplied in a compact magazine which is adapted to slip into and out of the camera so that the camera can be loaded in full daylight without any danger of fogging the film. These magazines are generally made of metal and are adapted to contain takeup and supply reels of film, guiding means for guiding the strip between the takeup reel past an exposure aperture, and are usually provided with film footage indicators by means of which the operator can tell the amount of film exposed or left unexposed within the magazine. In practice, these film magazines are loaded by the film manufacturer and are shipped out to the trade in a sealed condition. After these film magazines have been exposed, they are again shipped back to the film manufacturer or to an affiliated processing station where the processing of the film takes place. Inasmuch as these film magazines are rather expensive, they are used over and over again; so that it is very desirable to provide a shipping container for said magazines which is adapted to protect the magazine from rough handling during shipment and thereby extend the useful life thereof.

In order to facilitate the insertion of these magazines into magazine cameras in their proper positions, the magazines are sometimes provided with locating pins which are adapted to engage recesses located within the camera walls. Each magazine is also provided with a slide member which is adapted to cover the exposure aperture therein in order to render said aperture light tight and said slide member has a pin fixed thereto which is adapted to be engaged by a sliding means on the camera so that the exposure aperture of the magazine can be opened after the magazine has been inserted in the camera and the cover of said camera has been closed. The magazines are also generally provided with a film footage indicator by means of which the length of film exposed or unexposed in the magazine can be determined at a glance, and these film footage indicators are usually stamped in the walls of the magazine so that they are raised above the embossings thereon. Inasmuch as the locating pins, the actuating pins, and the footage indicators of such film magazines are adapted to project beyond the walls of said magazine, some means must be provided in packing said magazines for shipment whereby these parts which extend beyond the walls of the magazine are protected from becoming bent or damaged due to excessive pressure inflicted on the shipping container due to rough handling or accidental dropping.

The primary object of my invention therefore, is to provide a shipping container for film magazines which is adapted to support the magazine at its edges only whereby the walls of the magazine intermediate the supported points are spaced from the walls of the shipping container. Another object is to provide a shipping container which is adapted to support a film magazine in such a way that any parts on the magazine projecting beyond the walls thereof will not contact the outer walls of the shipping container.

And still another object is to provide a shipping container which is adapted to support a film magazine in spaced relation to the walls of the container without the use of individual packing inserts, i. e., corrugated boards, blocks, etc., which are ordinarily used for this purpose.

And yet another object is to provide a shipping container which is adapted to support a film magazine in such a way that the major portion of the magazine will be protected from pressure applied to the walls of the container, and which is adapted to protect the contents of the magazine against atmospheric conditions.

Another object is to provide a shipping container for a film magazine which is adapted to support the magazine in such a way that the major portion of the end walls of said magazine as well as the major portions of the top and bottom walls are spaced from the container.

And another object is to provide a shipping container for a film magazine in which the supporting portions thereof are offset so that when the shipping container is enclosed in an outside carton, the supporting surfaces of said shipping container are adapted to be spaced from the walls of said carton thereby protecting the most vulnerable portions of the container from pressure exerted on the external carton.

Briefly, my shipping container consists of two shallow box-like housings the walls at the corners of which have three formations. This extends completely around the walls of the container sections, and the central formation is adapted to engage the extreme edges of a film magazine to support the magazine with all of the walls thereof with the exception of the supported edges, spaced from the container. The outside dimensions of the container are such that they will fit into the carton so that the magazine is well protected from damage due to shipping as well as protected against atmospheric conditions.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawing in which, Figure 1 is a section taken through the shipping container and a film magazine supported thereby, and showing the spacing of the magazine from the walls of the container; the contents of the magazine being omitted for the purpose of clarity.

Figure 2 is an end view of the external carton with the shipping container shown in dotted lines to show the corners thereof spaced from the external carton, Figure 3 is a fragmentary plan view of the shipping container showing one corner thereof.

Figure 4 is a perspective view of a typical film magazine for which my shipping container was designed, and Figure 5 is a sectional detail of one corner of my shipping container showing a modified corner supporting the film magazine.

Like reference characters refer to corresponding parts throughout the several figures.

Referring now to Figure 1, wherein a preferred embodiment of my novel shipping container is shown, the shipping container is shown as comprising a lower tray-like member indicated broadly as 6, which will hereinafter be referred to as a box, and an upper tray-like member indicated broadly as 7, which will hereinafter be referred to as a cover, said cover 7 being adapted to telescope with the box 6 to form a closed container in which the magazine M is to be enclosed. The shipping container is preferably closed. The shipping container is preferably made of thin metal sheeting for the sake of rigidity, but it is obvious that any material could be used which is capable of being formed and which is rigid enough to hold its shape. Inasmuch as the box 6 and the cover 7 are identical as to shape and formation, in describing the construction of the shipping container, corresponding parts of the box 6 and the cover 7 will be referred to with the same reference characters throughout.

Referring now to Figure 4, wherein I have illustrated a typical film magazine for which my shipping container is designed, the magazine referred to broadly as M comprises a box portion 8 which is adapted to contain the film supply and takeup reels, and guiding mechanism for the film strip not shown. A shallow cover 9 is adapted to telescope with the box portion 8 to completely enclose the magazine and make the interior thereof light tight. The side wall 10 is provided with the usual exposure aperture 11 and an opening 12 through which the film claw of a camera is adapted to extend for the purpose of engaging the film perforations to effect a film advancement when the magazine is properly inserted in the camera. In order to prevent the entrance of light into the magazine through the exposure aperture 11 and the opening 12, a resilient slide member, not shown, is adapted to be slid to and from covering position therewith. A pin 13 fixed to one end of the said resilient slide member projects through a slot 14 in the side wall of the magazine, and is adapted to be engaged by a sliding member in the camera when the magazine is inserted therein for the purpose of removing the resilient slide member from a covering position with respect to the exposure opening 11 and the opening 12. The cover 9 of the magazine is provided with a film footage indicator 15 including a forming 16 which is struck up above the cover of the magazine so that it projects beyond the embossing 17 around the edge thereof. This particular type of magazine is completely disclosed in U. S. Patent 2,043,914 to Otto Wittel, and in no way forms a part of my invention; but is merely illustrated as being a typical film magazine having projecting portions, i. e., 13 and 16, which are to be protected against damage during shipment.

Referring back to Figure 1, the margins of the lateral walls 18 of the box 6, and cover 7, are vertically offset as indicated at 19 to form lateral supporting surfaces 20 which are adapted to support the magazine M at its corners as shown. The vertical offset 19 is made great enough to allow the forming 16 and the lateral walls of the magazine intermediate the lateral supporting surface 20 to be substantially spaced from the lateral walls 18 of the shipping container. The margins of the side walls 21 of the box and cover adjacent the supporting surfaces 20 are offset horizontally as indicated at 22 whereby vertical supporting surfaces 23 are formed which are adapted to engage the magazine M at its corners, and space the side walls of said magazine from the side walls 21 of the box and cover intermediate the vertical supporting surface 23. The horizontal offset 22 of the vertical supporting surfaces 23 is sufficient to insure that the pin 13 faces 23 is sufficient to insure that the pin 13 projecting through the side walls of the magazine M is substantially spaced from the side walls 21 of the box 6 and cover 7. It is obvious to one skilled in the art that a shipping container having lateral and vertical surfaces 20 and 23 respectively formed at its corners as described above, is adapted to support a film magazine M at its corners only whereby the major portions of the walls of said magazine and any part projecting from the walls thereof are substantially spaced from the walls of the shipping container so that the magazine walls and the parts thereon are protected from damage during shipment. Any excess pressure that is applied to the shipping container will be absorbed thereby with the exception of pressure applied on the supporting surfaces 20 and 23, but since the corners of the magazine are not so vulnerable as the portions of the walls intermediate the corners, they are capable of absorbing a greater amount of pressure without suffering damaging effects. It is to be understood that the lateral walls 18 and the side walls 21 can be offset different amounts to adapt the shipping container to film magazine of types other than the one I have shown for illustrative purposes without deviating from the spirit of my invention.

In addition to the protection afforded the magazine M by the shipping container, which comprises the box 6 and the cover 7, the container is placed in a substantially rectangular carton 30, see Figure 2, said carton being formed in any well-known manner so that an opening is provided in one wall thereof through which the shipping container can be inserted thereinto.

The carton 30 is adapted to be of such a width that its lateral walls 31 will contact the lateral walls 18 of the container, and its side walls 32 will contact the side walls 21 of the container. It will be observed, that when the shipping container is placed in the carton 30, the supporting surfaces 20 and 23 of said container are spaced from the corner of the carton 30 so that any shock coming on the corner of the carton 30 will be totally or partially absorbed by the corner of said carton and will not be transmitted to the supporting portions of the shipping container and subsequently to the film magazine M, therein. Therefore, since the shipping container itself is so constructed as to protect all but the corners of the magazine from damage due to pressure, and the carton is adapted to protect said supporting corners, it can be seen that the entire magazine M as finally packed is protected against damage due to excessive pressure in shipping.

As normally formed, the ridge 35 formed at the junction of the vertical and supporting surfaces 23 and 20 respectively is on a diagonal drawn from the ridge 36 formed by the offset 19 and the ridge formed by the offset 22, so that if the carton 30 and container were dropped the blow would probably be taken by one of these two ridges which serve to protect the ridge 35.

Referring now to Figure 5, a sectional detail of one corner of the shipping container with a film magazine in place therein is shown embodying a modified construction of the supporting surfaces for the magazine wherein said surfaces are set within a diagonal across the ridges 36 and 37 for the purpose of protecting them from all blows incurred during shipment. In Figure 5, the margins of the lateral walls 18 of the shipping container are offset vertically as indicated at 19′ whereby a lateral supporting surface 20′ is formed. The margins of the side walls 21′ of the container adjacent the corners thereof are offset horizontally as indicated at 22′ to form a vertical supporting surface 23′. The lateral supporting surface 20′ and the vertical surface 23′ are adapted to form a ridge 35′ and support a magazine M at its corners only, as described above. In the construction shown in Figure 5, the vertical offset 19′ and the horizontal offset 22′ are of greater length than the respective lateral and vertical supporting surfaces 20′ and 23′ respectively formed thereby so that the ridge 35′ is adapted to lie within a diagonal D drawn from the edge of ridge 36 to the edge of ridge 37. By constructing the supporting corner of the shipping container in this manner, the ridge 35′ is protected from receiving blows during shipment, because the ridges 36 and 37 will have a tendency to take all blows with the exception of those received from striking sharp edges of objects having a surface dimension less than the distance between the ridges 36 and 37.

A shipping container constructed in accordance with the above specifications is adapted to support a film magazine at its corners only, and space the remainder of the magazine between the supported surfaces from the walls of the shipping container so that the walls of the magazine or projecting parts on said walls will be protected from damage incurred during shipment. The film magazines of the type described are loaded by the film manufacturer and are returned to him or to an affiliated processing station after exposure, and since these magazines are made of metal and are rather expensive, they are used over and over again until they are damaged beyond repair. Therefore, since my novel shipping container protects these magazines from damage, and thereby increases the length of their usefulness, and are themselves capable of re-use; they soon pay for themselves. A shipping container as described is adapted to support a magazine at its corners only, the corners of the magazine being the strongest part thereof are adapted to withstand considerable pressure without being damaged; but when said shipping container is placed in the external shipping carton the supporting surfaces of the container are adapted to be spaced from the carton with the result that the entire magazine is spaced from the walls of its shipping package for protective purposes. A shipping container constructed in accordance with my invention provides means for spacing the film magazine from the walls of the shipping container for the purpose of protecting the magazine from damaging blows during shipment, and since the spacing and supporting means is inherent in the container itself due to the formation thereof; and does away with the need for separate packing sections such as spacing blocks or corrugated fill-ins as are commonly used for such purposes.

Although I have shown and described certain specific embodiments of my invention, I am fully aware that many modifications thereof are possible. My suggestion, therefore, is not to be restricted except in so far as is necessitated by the prior art and by the spirit of the appended claims.

Having thus described my invention, what I declare as new and desire to secure by Letters Patent is:

1. A shipping container comprising a closed container having lateral and side walls, said container adapted to receive a film magazine having angular edges, lateral supporting surfaces formed by offsetting the margins of said lateral walls inwardly, side supporting surfaces formed by offsetting the margins of said side walls inwardly, the offset of said lateral supporting surfaces being of greater length than the lateral supporting surface formed thereby, said supporting surfaces adapted to engage and support the film magazine at its angular edges, whereby the magazine is spaced from the outer walls of the container intermediate said supporting surfaces.

2. A shipping container adapted to receive a substantially rectangular film magazine and comprising spaced lateral walls, spaced side walls connecting said lateral walls, lateral supporting surfaces formed around the margins of said lateral walls by offsetting the margins of said lateral walls inwardly, side supporting surfaces formed around the margins of said side walls by offsetting the margins thereof inwardly, said lateral and side supporting surfaces adapted to receive and support said film magazine at its edges, whereby the magazine is spaced from the walls of the container intermediate the supporting surfaces.

3. A shipping container for a substantially rectangular film magazine comprising a closed container having lateral and side walls, supporting surfaces around the entire margins of said lateral and side walls and offset inwardly from said walls, said supporting surfaces adapted to support the film magazine at its edges whereby the magazine is spaced from said lateral and side walls intermediate the supporting surfaces.

4. A shipping container adapted to receive a substantially rectangular film magazine and comprising a top, a bottom, vertical side walls connecting said top and bottom, offset horizontal supporting surfaces formed around the margins of said top and bottom on which the film magazine is adapted to be supported in spaced relation with respect to the top and bottom intermediate said horizontal supporting surfaces, offset vertical supporting surfaces formed by offsetting the margins of the side walls adjacent said horizontal supporting surfaces, said horizontal and vertical supporting surfaces adapted to support the film magazine at its edges, whereby said magazine is spaced from the walls of the container intermediate said supporting surfaces.

5. A shipping container for a substantially rectangular film magazine comprising a bottom tray-like member, a top tray-like member adapted to telescope with said bottom member to form a closed container, the corners of said top and bottom members offset horizontally and vertically to provide horizontal and vertical supporting surfaces, said horizontal and vertical supporting surfaces adapted to support the film magazine at its corners, whereby said magazine is spaced from the walls of said container intermediate said supporting surfaces.

6. A shipping container for a film magazine comprising a pair of shallow box-like members adapted to telescope one within the other to form a closed container, horizontal and vertical supporting surfaces formed around the entire corners of said box-like members and adapted to support a film magazine at its edges, said supporting surfaces being offset inwardly with respect to the walls of said box-like members, whereby a film magazine will be spaced from the outer walls of the container intermediate said supporting surfaces when supported by said surfaces.

7. In a shipping container for a substantially rectangular film magazine the combination with a bottom member having vertical walls, a top member having vertical walls adapted to telescope with the bottom member to form a closed container, horizontal and vertical supporting surfaces for supporting a magazine at its corners and spacing it from the walls of the closed container intermediate said supporting surfaces, said horizontal and vertical supporting surfaces adapted to be formed by offsetting the corners of the top and bottom members horizontally and vertically inwardly, of a rectangular carton adapted to enclose said shipping container whereby the supporting surfaces of said container are spaced from the walls of the carton.

WILLIAM N. SCHULER.